United States Patent
Belogolovy et al.

(10) Patent No.: US 7,889,806 B2
(45) Date of Patent: Feb. 15, 2011

(54) METHOD AND APPARATUS TO IMPROVE PERFORMANCE IN A MULTICARRIER MIMO CHANNEL USING THE HADAMARD TRANSFORM

(75) Inventors: Andrey V Belogolovy, St. Petersburg (RU); Vladislav A Chernyshev, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 951 days.

(21) Appl. No.: 11/659,264

(22) PCT Filed: Jul. 20, 2006

(86) PCT No.: PCT/RU2006/000386

§ 371 (c)(1),
(2), (4) Date: Feb. 2, 2007

(87) PCT Pub. No.: WO2008/010740

PCT Pub. Date: Jan. 24, 2008

(65) Prior Publication Data

US 2009/0122897 A1    May 14, 2009

(51) Int. Cl.
*H04B 7/02* (2006.01)

(52) U.S. Cl. .................. 375/267; 375/260; 375/299; 375/349; 375/347

(58) Field of Classification Search .................. 375/267, 375/260, 299, 349, 347
See application file for complete search history.

(56) References Cited

U.S. PATENT DOCUMENTS

| | | | |
|---|---|---|---|
| 2004/0001564 A1 * | 1/2004 | Chan et al. ............... | 375/341 |
| 2004/0047402 A1 * | 3/2004 | Hui et al. ................. | 375/148 |
| 2005/0018782 A1 * | 1/2005 | Costa et al. .............. | 375/260 |
| 2007/0147414 A1 * | 6/2007 | Niu et al. ................. | 370/465 |
| 2008/0187034 A1 * | 8/2008 | Liang et al. .............. | 375/232 |

FOREIGN PATENT DOCUMENTS

| | | |
|---|---|---|
| CN | 101496322 A | 7/2009 |
| DE | 19647833 A1 | 5/1998 |
| DE | 2391775 | 4/2004 |
| FR | 2860666 | 4/2005 |
| GB | 2391775 A | 2/2004 |
| WO | 2008/010740 A1 | 1/2008 |

OTHER PUBLICATIONS

Ramachandran et al. (Symbol spreading for ultrawideband systems based on multiband OFDM, Sep. 2004, IEEE, vol. 2, pp. 1204-1209).*

(Continued)

*Primary Examiner*—Shuwang Liu
*Assistant Examiner*—Kabir A Timory
(74) *Attorney, Agent, or Firm*—Thorpe North & Western LLP

(57) ABSTRACT

The Hadamard transform is used to spread data within data blocks in a multicarrier MIMO system, before transmission. In this manner, the negative effects caused by the clustering of bad subcarriers (i.e., subcarriers having a low transmission coefficient due to fading) may be reduced. In at least one embodiment, a MAP-type detection scheme is used in the receiver to extract bit reliabilities from the received signals.

8 Claims, 7 Drawing Sheets

OTHER PUBLICATIONS

Alamouti, Siavash "A Simple Transmit Diversity Technique for Wireless Communications", *IEEE Journal on Select Areas in Communications*, vol. 16. No. 8, (Oct. 1998), 1451-1458.

Zhongding, Lei "Iterative Detection for Walsh-Hadamard Transformed OFDM", *Vehicular Technology Conference, 2003 VTC 2003-Spring. The 57th IEEE Semiannual* vol. 1, Apr. 22-25, 2003 pp. 637-640 vol. 1, VTC 2003-Spring. The 57th IEEE Semiannual vol. 1, Apr. 22-25, 2003 pp. 637-640, vol. 1.

Bohnke, R. et al., "Efficient near maximum-likelihood decoding of multistratum space-time codes", *IEEE 60th Vehicular Technology Conference*, Sep. 26, 2004, (Sep. 29, 2004), 3679-3683.

Thirukkumaran, S. et al., "STTC-SD with LMMSE multi-user detection for WCDMA downlink", *Second IFIP International Conference on Wireless and Optical Communications Networks*, (Mar. 6, 2005), 453-457.

"International Search Report and Written Opinion received", *PCT/RU2006/000386*, (Jul. 16, 2007), 1-13.

International Preliminary Report on Patentability received for PCT Patent Application No. PCT/RU2006/000386, mailed on Jan. 29, 2009, 8 pages.

* cited by examiner

METHOD AND APPARATUS TO IMPROVE PERFORMANCE IN A MULTICARRIER MIMO CHANNEL USING THE HADAMARD TRANSFORM

TECHNICAL FIELD

The invention relates generally to wireless communication and, more particularly, to techniques for improving communication performance in a wireless channel.

BACKGROUND OF THE INVENTION

Multicarrier communication is a technique for transmitting data that divides the data into multiple portions and then transmits the portions in parallel via a number of separate narrowband carriers. In a multicarrier channel, multipath fading can cause the transmission coefficients associated with one or more subcarriers to be low while those associated with other subcarriers are high. These low transmission coefficients can result in a poor quality signal in the receiver for these subcarriers (e.g., low signal to noise ratio (SNR)), which may reduce the receiver's ability to reliably demodulate and decode the corresponding data. In many cases, the subcarriers that experience bad fading will occur in clusters.

One technique for reducing the effects of multipath fading is known as multiple input, multiple output or MIMO. MIMO is a wireless communication technique that uses multiple antennas at each end of a communication channel (or at least at one end) to provide multiple spatial channels through which signals may propagate. MIMO can reduce some of the negative effects of fading by spreading signals across several channels with relatively independent fading characteristics. However, even when MIMO is being using, bit error rates can still be too high due to impulse or frequency noise that effects some or all of the channels at the same time. New techniques are needed for effectively dealing with fading in MIMO based systems.

DETAILED DESCRIPTION

Figure 1:
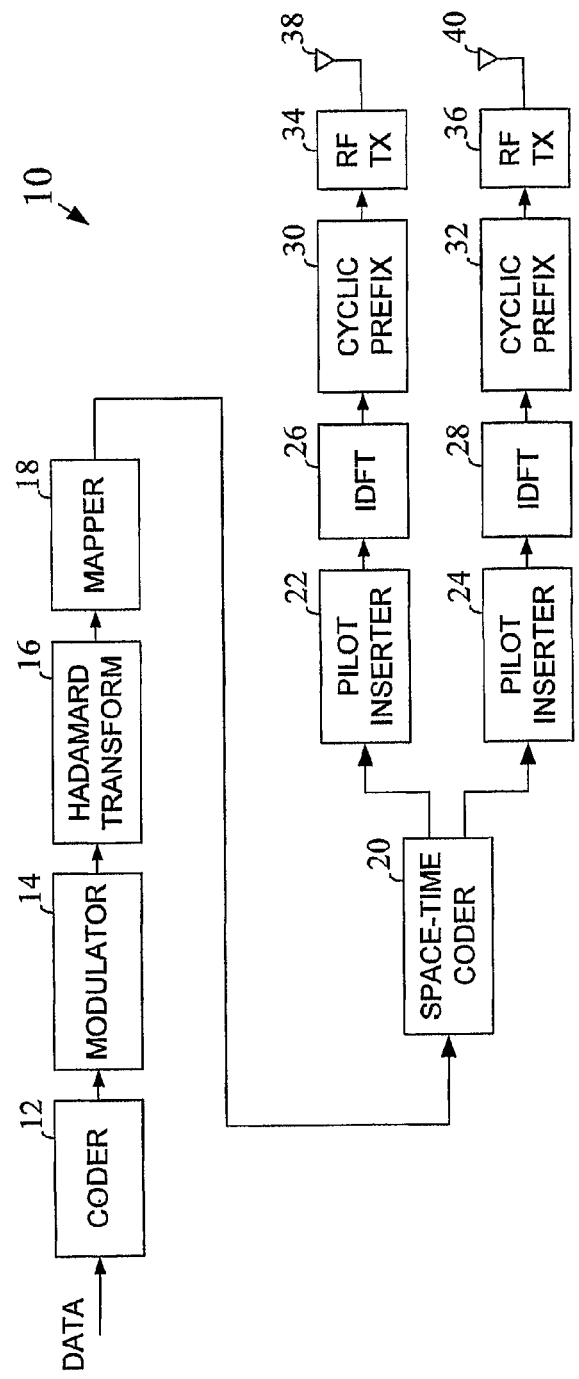
FIG. 1 is a block diagram illustrating an example wireless transmitter system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques for performing multicarrier communication in a MIMO channel by making use of the Hadamard transform. The Hadamard transform allows data to be spread among a number of subcarriers within a defined block. The transformation is orthogonal so data can always be extracted back. As described above, multipath fading typically affects subcarriers in clusters. Use of the Hadamard transform can increase the likelihood that data can be extracted from bad subcarriers by spreading the data among a group of subcarriers in a known manner. Efficient techniques are also provided for demodulating and decoding Hadamard transformed signals in the receiver. The inventive techniques and structures may be used within any multicarrier MIMO channel. In at least one embodiment, the techniques are implemented within a wireless network using a form of multicarrier communication known as orthogonal frequency division multiplexing (OFDM) or the related orthogonal frequency division multiple access (OFDMA).

FIG. 1 is a block diagram illustrating an example wireless transmitter system 10 in accordance with an embodiment of the present invention. The wireless transmitter system 10 may be used within, for example, a multicarrier wireless network that uses multiple input, multiple output (MIMO) techniques. In at least one embodiment, the wireless transmitter system 10 is used within a base station of a wireless network, although many other applications also exist. As shown, the transmitter system 10 includes: a coder 12, a modulator 14, a Hadamard transformer 16, a mapper 18, a space-time coder 20, first and second pilot inserters 22, 24, first and second inverse discrete Fourier transforms 26, 28, first and second cyclic prefix units 30, 32, and first and second radio frequency (RF) transmitters 34, 36. One or more antennas 38, 40 may be associated with each of the RF transmitters 34, 36 to facilitate the transmission of signals into the wireless channel. Any type of antennas may be used including, for example, dipoles, patches, helical antennas, and/or others. In the illustrated embodiment, two transmit antennas 38, 40 are used. In other embodiments, 3 or more transmit antennas are used within a transmitting system. In at least one embodiment, only a single transmit is used.

The coder 12 receives a stream of input data bits and encodes the bits using a forward error, correction (FEC) code. Any error correction code may be used. In some embodiments, FEC coding is not used. The modulator 14 receives the encoded bits (or the unencoded bits if FEC coding is not used) and uses the bits to form symbols in accordance with a predetermined modulation scheme (e.g., binary phase shift keying (BPSK), quadrature phase shift keying (QPSK), 16-quadrature amplitude modulation (16QAM), 64QAM, etc.). The modulator 14 may output a vector of symbols $X=(x_1, x_2, \ldots, x_N)$ of size N, each symbol of which is to be transmitted via one subcarrier of a multicarrier signal.

The Hadamard transformer 16 receives the vector X from the modulator 14 and divides the symbols thereof into blocks of size M. The Hadamard transformer 16 then performs a Hadamard transform on each block using an M×M Hadarnard matrix. Performing a Hadamard transform on a block B of size M results in a transformed block $\hat{B}$ of the same size. The Hadamard transformer 16 may then place the elements of each transformed block into the same positions of vector X that the symbols of the corresponding original block were taken from. The mapper 18 may then map the symbols received from the Hadamard transformer 16 to the tones of the multicarrier signal.

The space-time coder 20 receives the signals output by the mapper 18 and uses them to perform space time coding based MIMO. Space-time coding is a technique that distributes information to be transmitted across space (i.e., multiple antennas) and time in a manner that achieves enhanced diversity without a significant increase in required bandwidth. In the illustrated embodiment, the transmitter system 10 includes two transmit antennas 38, 40, so the space-time coder 20 will use a space-time code intended for 2 antennas. In other embodiments, additional transmit antennas may be used with corresponding space-time codes. In still other embodiments, space-time coding is not used. The pilot inserters 22, 24 insert pilot tones into the multicarrier signals to be transmitted by each of the transmit antennas 38, 40. The pilot tones may be used by the receiver for estimation and synchronization purposes. The pilot tones may be distributed in frequency across the multicarrier symbol.

The IDFTs 26, 28 receive frequency domain modulated subcarriers (data subcarriers and pilot subcarriers) from the pilot inserters 22, 24 and convert them to a time domain representation for transmission. The time domain representation may then be converted from a parallel form to a serial form. Any type of IDFTs may be used including, for example, inverse fast Fourier transforms (IFFTs), and/or others. The cyclic prefix units 30, 32 add cyclic prefixes to the time domain signals for use in reducing intersymbol interference (ISI) and intercarrier interference (ICI) in the channel. The resulting signals may then be upconverted and amplified by the RF transmitters 34, 36 and delivered to the transmit antennas 38, 40 for transmission into the MIMO channel. It should be appreciated that FIG. 1 illustrates one possible transmitter architecture in accordance with the present invention. Other architectures may alternatively be used.

As described above, in at least one embodiment, the first task of the Hadamard transformer 16 is to divide a vector of symbols X into one or more blocks of size M. A Hadamard transform is then applied to each block using an M×M Hadamard matrix. M may be any integer value up to the size of the vector X, for which a Hadamard matrix exists. In general, the larger the value of M that is used, the higher the computational complexity involved in performing the transform. Therefore, it may be desirable to use a smaller value of M if computing power is in short supply. However, the value of M that is used should be large enough to spread out the effects of a cluster of low transmission coefficient subcarriers in a manner that reduces the likelihood of demodulation/decoding problems.

Figure 2:
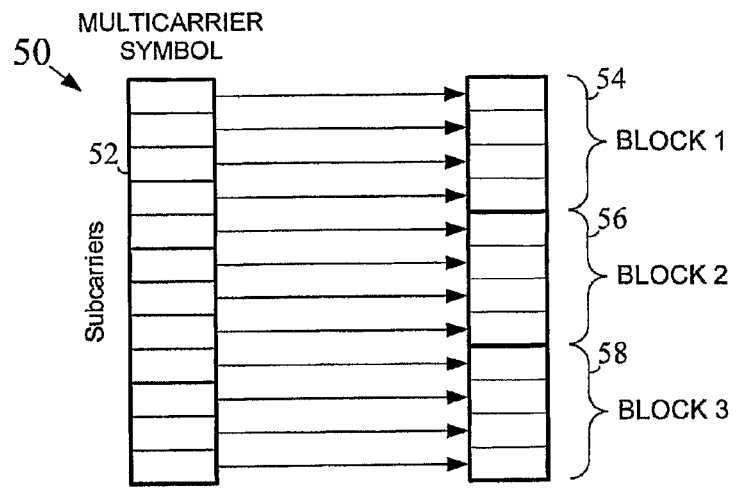
FIGS. 2 and 3 are diagrams illustrating two ways to divide the symbols of a transmit vector into blocks in accordance with embodiments of the present invention.
Figure 3:
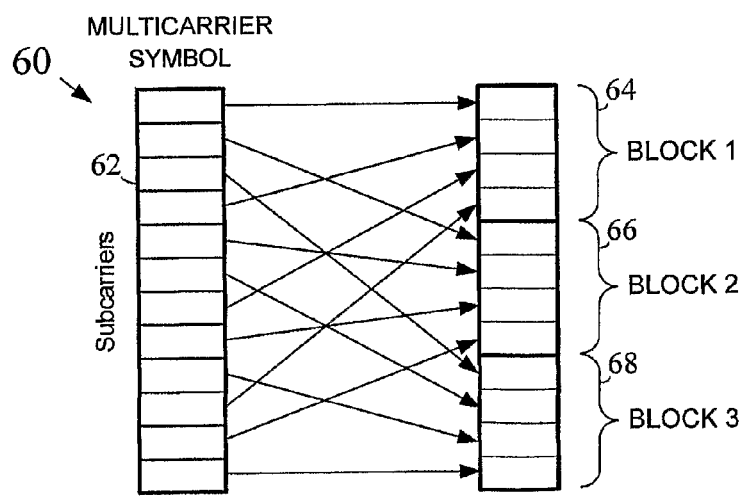

The symbols of vector X may be divided into blocks in a variety of different ways in accordance with embodiments of the present invention. FIGS. 2 and 3 illustrate two ways 50, 60 to form the blocks in a system that uses a block length of 4. As shown in FIG. 2, in one possible approach, the symbols associated with the subcarriers of a multicarrier symbol 52 are divided into blocks in the same order as they originally occur in the symbol. Thus, the symbols associated with the first four subcarriers of the multicarrier symbol 52 form a first block 54, the symbols associated with the next four subcarriers of the multicarrier symbol 52 form a second block 56, and the symbols associated with the next four subcarriers after that form a third block 58. In another possible approach, as illustrated in FIG. 3, the symbols associated with the subcarriers of an original multicarrier symbol 62 are distributed to blocks 64, 66, 68 in a round robin type fashion. That is, a symbol associated with a first subcarrier of multicarrier symbol 62 is assigned to the first block 64, a sample associated with a second subcarrier is assigned to the second block 66, a sample associated with a third subcarrier is assigned to the third block 68, a sample associated with a fourth subcarrier is assigned to the first block 64, a sample associated with a fifth subcarrier is assigned to the second block 66, and so on. Because bad channels are typically grouped in clusters, as described previously, this technique is desirable as it places subcarriers that are far from one another into each block. Other techniques for forming the blocks may alternatively be used. The receiver should know the way that the blocks were formed from the original vector X.

To perform the Hadamard transform on a block of symbols, the symbols may first be arranged into a vector column of length M, as follows:

$$B = (b_1 \ldots b_M)^T$$

where $b_1 \ldots b_M$ are the symbols. The transform may then be performed as:

$$\hat{B} = (\hat{b}_1 \ldots \hat{b}_M)^T = \frac{1}{\sqrt{M}} \cdot H_M \cdot B$$

where $H_M$ is a Hadamard matrix of size M. The above transform may be performed for each of the defined blocks. As described previously, the elements of each transformed block $\hat{B}$ may be placed within the same positions of the vector X from which the symbols of the corresponding source block B were taken to form the transformed vector $\hat{X}$. A Hadamard matrix may be defined as an n×n matrix that satisfies:

$$H_n H_n^T = n I_n$$

where $I_n$ is the n×n identity matrix. Usually, a 4×4 Hadamard matrix is expressed in the following form:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

However, the form of the matrix that is used does not matter as long as the matrix has the property of orthogonality.

Referring back to FIG. 1, the space-time coder 20 receives symbols from the mapper 18 and codes them using a space-time code for transmission from the transmit antennas 38, 40 of the transmitter system 10. In at least one embodiment, an Alamouti code is used as the space time code. Using an Alamouti code for a two antenna system, the space-time coder 20 will first receive two symbols $S_0$, $S_1$ that need to be transmitted to a remote receiver using antenna 38 and antenna 40. At a first symbol time, the space-time coder 20 will cause $S_0$ to be transmitted from antenna 38 and $S_1$ to be transmitted from antenna 40. At a subsequent symbol time, the space-time coder 20 will cause $-S_1^*$ to be transmitted from antenna 38 and $S_0^*$ to be transmitted from antenna 40 (where * denotes the complex conjugate). For each receive antenna within the receiver, the received signals at the first and second symbol times are:

$$r_0 = h_0 s_0 + h_1 s_1 + n_0$$

$$r_1 = -h_0 s_1^* + h_1 s_0^* + n_1$$

where $r_0$ and $r_1$ are the received signals at the first and second symbol times, respectively; $h_0$ and $h_1$ are the channel transmission coefficients associated with antenna 38 and antenna 40, respectively; and $n_0$ and $n_1$ are the Gaussian noise in the channel at the first and second symbol times, respectively. A combiner in the receiver can then reconstruct the transmitted signals as follows:

$$\hat{s}_0 = h_0^* r_0 + h_1 r_1^* = (|h_0|^2 + |h_1|^2) s_0 + h_0^* n_0 + h_1 n_1^*$$

$$\hat{s}_1 = h_1^* r_0 + h_0 r_1^* = (|h_0|^2 + |h_1|^2) s_1 + h_0^* n_1 + h_1 n_0$$

The combined signals from all of the receive antennas are the sum of the combined signals from each receive antenna. In other embodiments, space-time codes other than Alamouti codes (or no space-time code) may be used.

Figure 4:
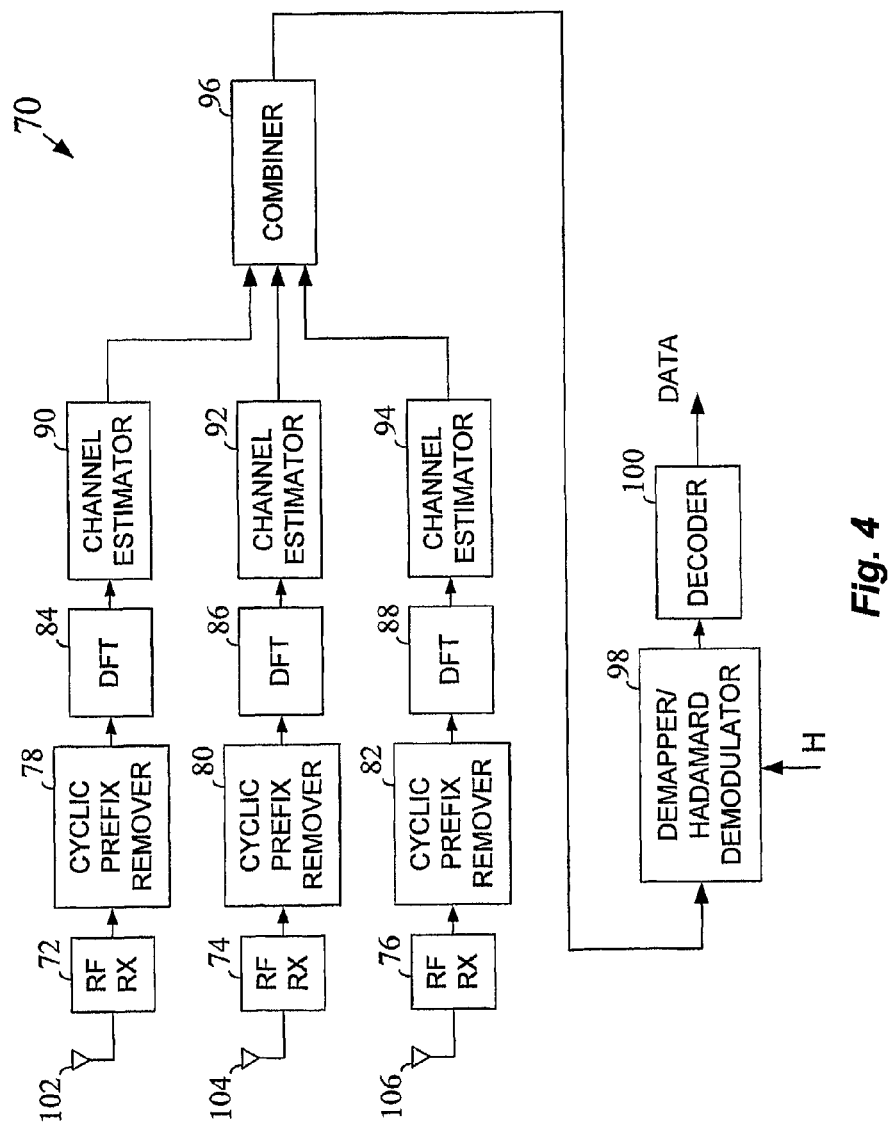
FIG. 4 is a block diagram illustrating an example wireless receiver system in accordance with an embodiment of the present invention.

After being transmitted, the Hadamard transformed blocks propagate through the MIMO channel to the receiver. The receiver must then process the received signals to extract the user data carried thereby. FIG. 4 is a block diagram illustrating an example wireless receiver system 70 that may be used to process these received signals in accordance with an embodiment of the present invention. The wireless receiver system 70 may be used within, for example, a multicarrier wireless network that uses MIMO techniques. In at least one embodiment, the wireless receiver system 70 is used within a subscriber station of a wireless network, although other applications also exist. As depicted, the receiver system 70 includes: first, second, and third RF receivers 72, 74, 76; first, second, and third cyclic prefix removers 78, 80, 82; first, second, and third discrete Fourier transforms (DFTs) 84, 86, 88; first, second, and third channel estimators 90, 92, 94; a combiner 96; a demapper/Hadamard demodulator 98; and a decoder 100. In addition, the first, second, and third RF receivers 72, 74, 76 may each be coupled to one or more receive antennas 102, 104, 106 to facilitate the reception of signals from the MIMO channel. Any type of antennas may be used for the receive antennas including, for example, dipoles, patches, helical antennas, and/or others. Although illustrated with three receive antennas 102, 104, 106, it should be appreciated that any number of receive antennas (i.e., two or more) may be used within the receiver system 70.

The RF receivers 72, 74, 76 process the signals received from the MIMO channel by the corresponding receive antennas 102, 104, 106. The RF receivers 72, 74, 76 may, for example, amplify the received signals and downconvert the signals to a baseband representation. The downconverted signals may also be analog to digital converted. The cyclic prefix removers 78, 80, 82 remove the cyclic prefixes from the received signals. After the cyclic prefixes have been removed, the DFTs 84, 86, 88 convert the signals from a time domain representation to a frequency domain representation. Any type of DFTs may be used including, for example, fast Fourier transforms (FFTs) and/or others. A serial to parallel conversion may be performed at the inputs of the DFTs 84, 86, 88. The channel estimators 90, 92, 94 may use pilot tones within the received signals to generate channel estimates for the corresponding channels. The combiner 96 may then combine the received signals from all of the receive antennas in a predetermined manner. If space-time coding was used in the transmitter, then the combination of the received signals may be tailored to the particular space-time code that was used.

The combined signal may next be input to the demapper/Hadamard demodulator 98. The demapper/Hadamard demodulator 98 both demaps and demodulates the symbols received from the transmitter. In addition to the combined signal, the demapper/Hadamard demodulator 98 also receives channel information generated by the channel estimators 90, 92, 94. In at least one embodiment, the demapper/Hadamard demodulator 98 uses maximum a posteriori (MAP) detection techniques to demodulate the combined signal and extract bit reliabilities from the signal. As a prestep, the demapper/Hadamard demodulator 98 may group the received symbols $Y=(y_1 \ldots y_N)$ into blocks of size M in a similar manner to that used by the transmitter to group the symbols of vector X. For each block, the demapper/Hadamard demodulator 98 may perform the following procedure. The block of symbols may first be represented as a column vector:

$$\hat{C} = (\hat{c}_1 \ldots \hat{c}_M)^T.$$

For each possible vector Z of length M containing source sample values $Z=(z_1 \ldots z_M)^T$, the demapper/Hadamard demodulator 98 may calculate the estimated received vector based on the channel estimates for the subcarriers from which the symbols of the current block were taken. A list may then be formed for the estimated received vectors. The estimated received vector for a source vector Z may be calculated as follows:

$$C = \begin{bmatrix} \mu_i & 0 & 0 \\ 0 & \ddots & 0 \\ 0 & 0 & \mu_M \end{bmatrix} \frac{1}{\sqrt{M}} \cdot H_M \cdot Z$$

where $\mu_i$ is the square amplitude coefficient of the corresponding subchannel.

Each of the blocks will consist of M transformed symbols. Thus, each block will carry pM bits, where p is the number of bits per symbol in the corresponding modulation scheme (e.g., for 16 QAM, p=4). For each bit that was used to form the initial vector, the demapper/Hadamard demodulator 98 searches the list twice to find a vector that is nearest in Euclidean distance to the received block. The first search is limited to estimated received vectors that have a zero in the relevant bit position of the original bit sequence and the second search is limited to estimated received vectors that have a one in the relevant bit position of the original bit sequence. The lowest Euclidean distance resulting from the first search may be labeled $d_0$ and the lowest Euclidean distance resulting from the second search may be labeled $d_1$. The reliability of the corresponding bit may then be calculated as $(d_0-d_1)$. A bit reliability value may be generated for each bit position. The bit reliability values may then be demapped based on the bit to signal mapping used. The described process produces an approximation of MAP in terms of log likelihood ratio (LLR)

that is suitable for further processing in the decoder 100. In other embodiments, other demodulation and detection techniques may be used.

Figure 5:
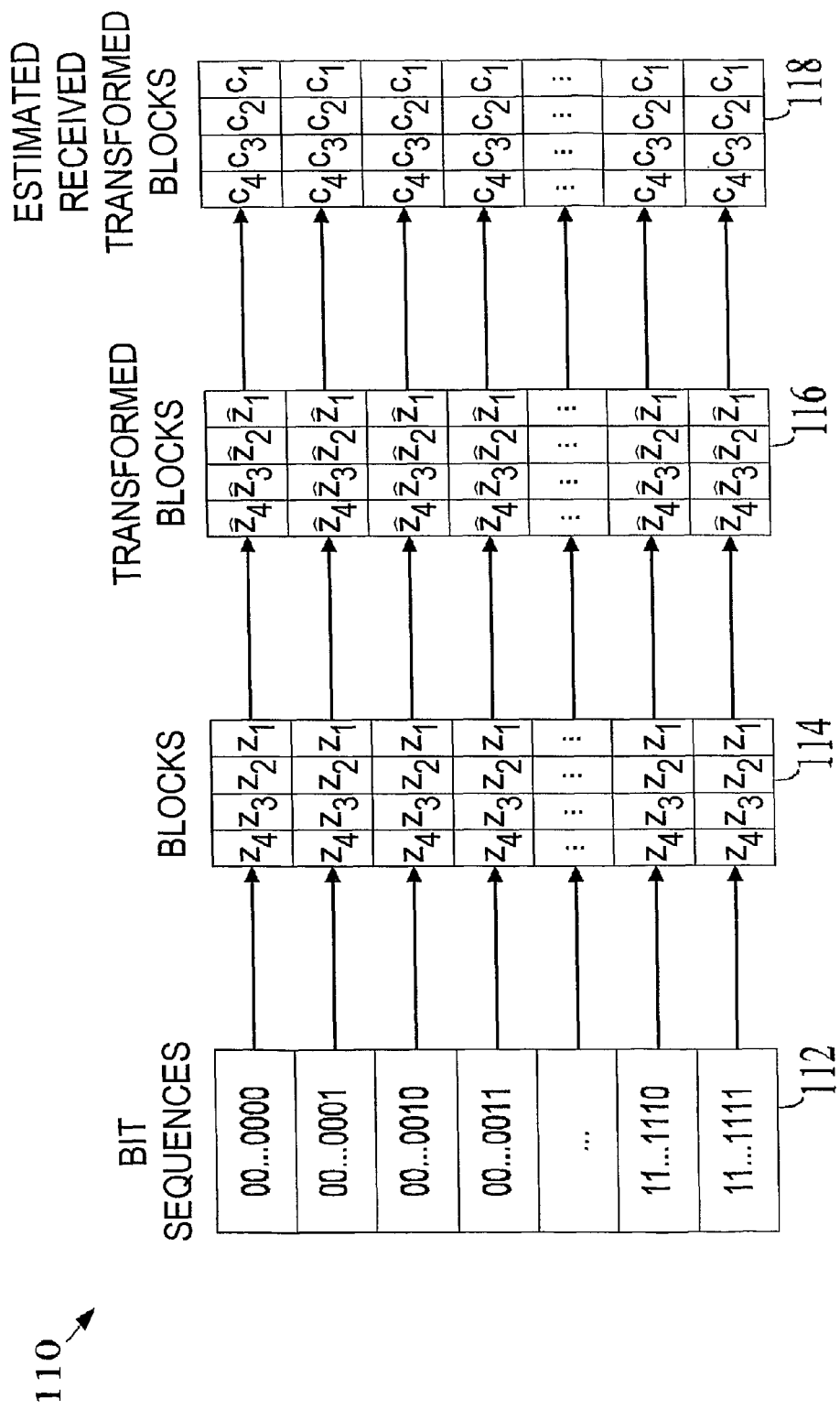
FIG. 5 is a diagram illustrating an example process for generating a list of estimated received signals for use in demodulating received signals in accordance with an embodiment of the present invention.

FIG. 5 is a diagram illustrating an example process 110 for generating the list of estimated received signals described above. As shown, the process 110 may start with a list of all possible source bit sequences that may be transmitted 112. Each bit sequence corresponds to a block of symbols ($z_1 \ldots z_4$) 114. The blocks may then be transformed using the Hadamard transform, as described previously, to form transformed blocks 116. Channel estimate information may then be used to estimate the received signals (i.e., received transformed blocks) that would result if each of the transformed blocks were transmitted 118.

Figure 6:
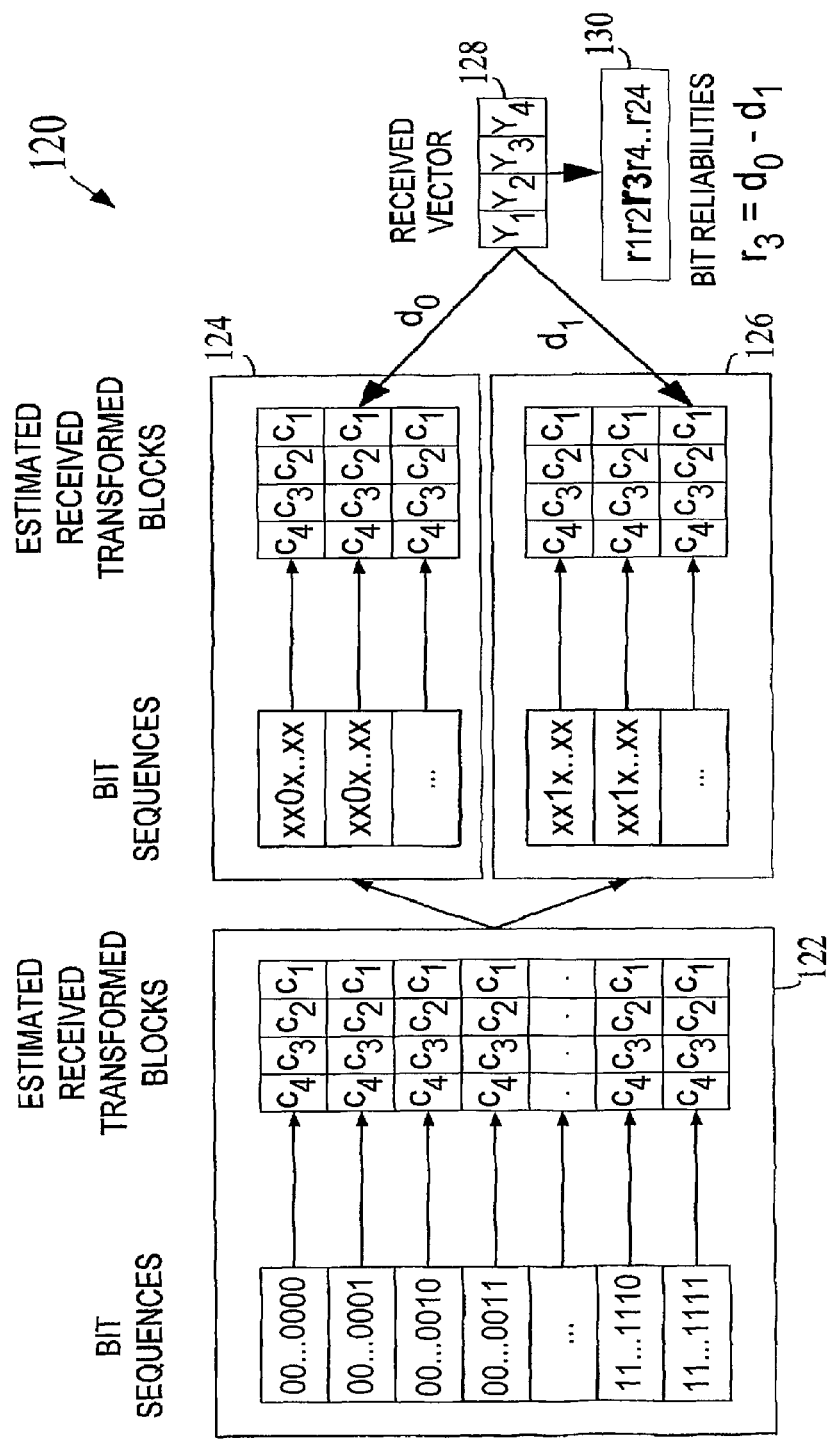
FIG. 6 is a diagram illustrating an example process for generating bit probabilities for a received signal using a list of estimated received signals in accordance with an embodiment of the present invention.

FIG. 6 is a diagram illustrating an example process 120 for generating bit probabilities for a received block using a list of estimated received signals in accordance with an embodiment of the present invention. The process starts with a list 122 such as the one generated in the process 110 of FIG. 5. For each bit position, the list may be divided into two portions; one having bit sequences with a zero in that bit position 124 and the other having bit sequences with a one in that bit position 126. The received block may then be compared to the estimated received transformed blocks in each of the two lists 122, 124. An entry is found in the first list 124 that has the lowest Euclidean distance $d_0$ from the received block 128 among the various entries. Similarly, an entry is found in the second list 126 that has the lowest Euclidean distance $d_1$ from the received block 128 among the various entries in that list. A bit reliability 130 is then calculated for that bit position as $r = d_0 - d_1$. This process may then be repeated for each bit position.

Figure 7:
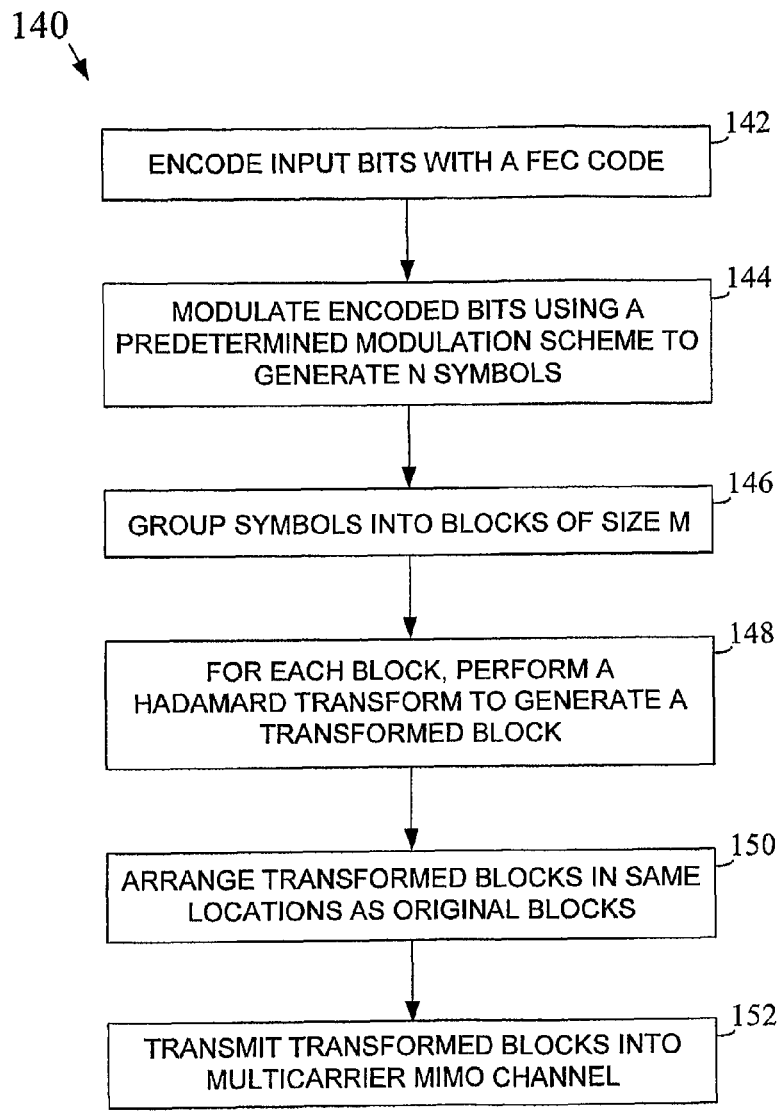
FIG. 7 is a flowchart illustrating an example method for use in processing data for transmission into a MIMO channel in a multicarrier system in accordance with an embodiment of the present invention.

FIG. 7 is a flowchart illustrating an example method 140 for use in processing data for transmission into a MIMO channel in a multicarrier system in accordance with an embodiment of the present invention. First, input data bits are encoded using a FEC code (block 142). Any of a wide variety of codes may be used. The encoded bits are then modulated using a predetermined modulation scheme to generate symbols (block 144). In at least one embodiment, FEC encoding is not used and the original uncoded bits are modulated to form the symbols. The symbols are grouped into blocks of size M (block 146). For each block, a Hadamard transform is performed to form a transformed block (block 148). The transformed blocks are arranged in the same manner as the original blocks (block 150). The transformed blocks are then transmitted into the multicarrier MIMO channel using MIMO techniques (block 152). In at least one embodiment, space-time coding is used to process the transformed blocks before they are transmitted into the channel. In some other embodiments, space time coding is not used.

Figure 8:
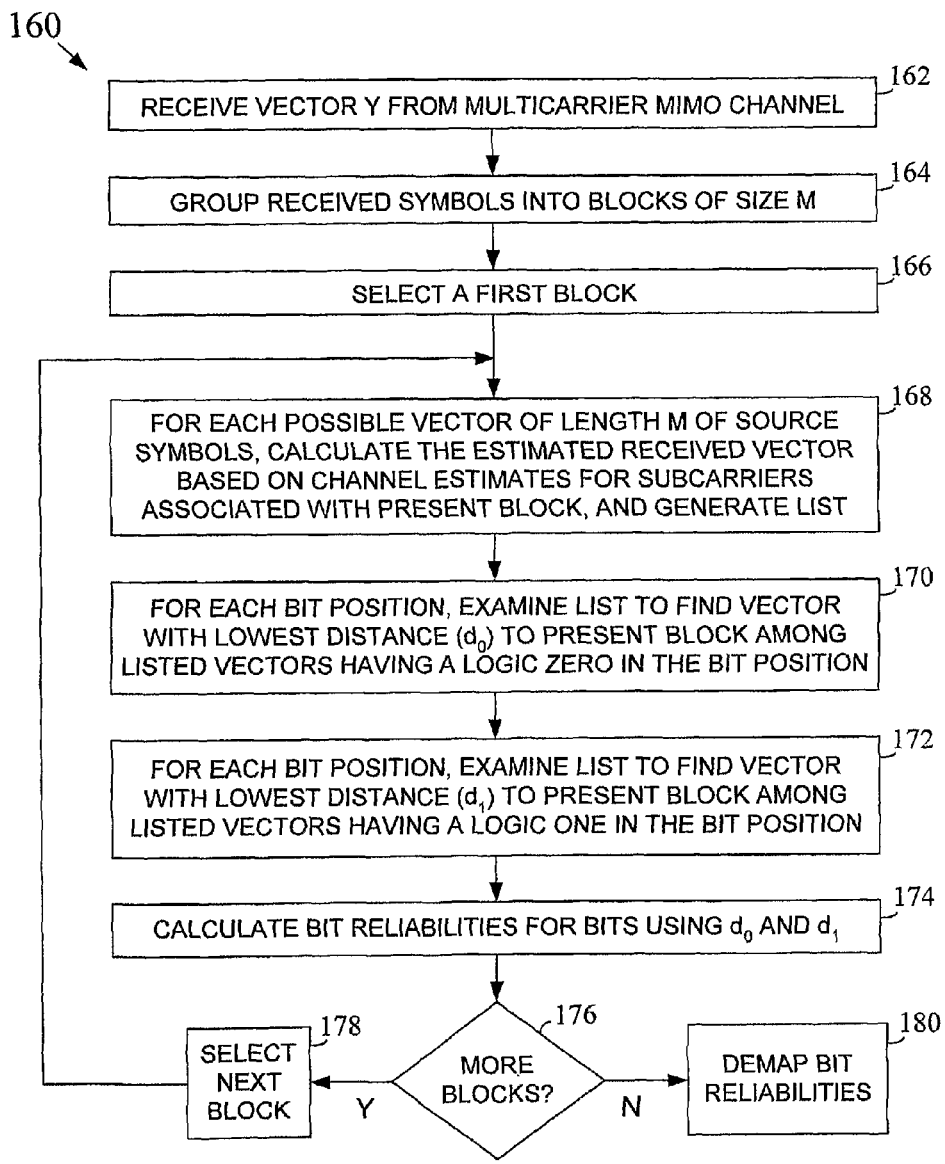
FIG. 8 is a flowchart illustrating an example method for processing received signals in a receiver in accordance with an embodiment of the present invention.

FIG. 8 is a flowchart illustrating an example method 160 for processing received signals in a receiver in accordance with an embodiment of the present invention. A vector Y is first received from a multicarrier MIMO channel (block 162). The symbols of the received vector Y are then grouped into blocks of size M, where M is the size of the Hadamard matrix used by the corresponding transmitter (block 164). A first block may then be selected for processing (block 166). For each possible vector Z of length M of source sample values, an estimated received vector may be calculated based on channel estimates for subcarriers associated with the present block (i.e., the subcarriers that carried the symbols within the present block to the receiver) (block 168). A list is formed using the estimated received vector information.

For each bit position, the list may be examined to find the estimated received vector that has the lowest Euclidean distance ($d_0$) to the actual received block for list entries that have a zero in the relevant bit position in their bit sequences (block 170). For each bit position, the list may also be examined to find the estimated received vector that has the lowest Euclidean distance ($d_1$) to the actual received block for list entries that have a one in the relevant bit position in their bit sequences (block 172). The bit reliability of each bit position may then be calculated using the corresponding values of $d_0$ and $d_1$ (block 174). For example, in at least one embodiment, the bit reliability is calculated as $r = d_0 - d_1$, although other calculation techniques may alternatively be used.

At this point, if there are more blocks to be processed (block 176-Y), a next block may be selected for processing (block 178). The method 160 may then return to block 168 and repeat. After all of the relevant blocks have been processed (block 176-N), the bit probabilities may be demapped (block 180). The demapped bit probabilities can then be decoded to complete the extraction of the desired data. In the above-described method 160, the various blocks are processed in series (one after another). In other embodiments, the blocks may be processed in parallel or in some other fashion.

As used herein, the term MIMO is not limited to channels that utilize multiple transmit antennas and multiple receive antennas but also applies to channels that utilize a single transmit antenna and multiple receive antennas. The Hadamard transform may still be used in such channels in accordance with an embodiment of the present invention, but space time coding would not normally be used in these embodiments.

Features of the present invention may be used in connection with any wireless networking standard that utilizes MIMO in a multicarrier environment. For example, in at least one implementation, inventive features are used in a network following the IEEE 802.16x wireless networking standard.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

It should be appreciated that the individual blocks illustrated in the block diagrams herein may be functional in nature and do not necessarily correspond to discrete hardware elements. For example, in at least one embodiment, two or more of the blocks in a diagram are implemented in software within one or more digital processing devices. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
receiving a vector Y from a multicarrier MIMO channel by a receiver, said vector Y having a plurality of symbols;
grouping said symbols of said vector Y into multiple blocks of size M using a Hadamard transformer, where M is the size of a Hadamard matrix used to Hadamard transform source blocks in a corresponding transmitter; and
performing the following for a first block in said multiple blocks:
calculating an estimated received vector for each possible vector of length M of source symbols;
generating a list with said estimated received vectors; and
using said list to generate bit reliabilities for use in decoding said vector Y
wherein using said list includes performing the following for a first bit position of a bit sequence:
first examining said list to find an estimated received vector with a lowest Euclidean distance (d0) to said first block among listed vectors having a zero in said first bit position of a corresponding source bit sequence:
second examining said list to find an estimated received vector with a lowest Euclidean distance (d1) to said first block among listed vectors having a one in said first bit position of a corresponding source bit sequence; and
calculating a bit reliability for said first bit position using d0 and d1.

2. The method of claim 1, wherein using said list further includes:
repeating first examining, second examining, and calculating for bit positions of said bit sequence other than said first bit position.

3. The method of claim 1, further comprising:
performing calculating, generating, and using for blocks in said multiple blocks other than said first block.

4. The method of claim 1, wherein:
calculating an estimated received vector includes using channel estimates for subcarriers associated with said first block.

5. The method of claim 1, wherein:
calculating a bit reliability for said first bit position includes calculating a difference between $d_0$ and $d_1$.

6. An apparatus comprising:
a combiner to combine signals received by multiple receive antennas from a multicarrier MIMO channel to generate a received vector Y having a plurality of symbols; and
a demapper/demodulator including:
logic to divide said symbols of said received vector Y into multiple blocks of length M, where M is the size of a Hadamard matrix used in a corresponding transmitter; and
logic to, for a first block in said multiple blocks, calculate an estimated received vector for each possible vector of length M of source symbols, generate a list with said estimated received vectors, and use said list to generate bit reliabilities
wherein said logic to use said list to generate bit reliabilities includes:
first logic to examine said list to find an estimated received vector with a lowest Euclidean distance ($d_0$) to said first block among listed vectors having a zero in a first bit position of corresponding source bit sequences;
second logic to examine said list to find an estimated received vector with a lowest Euclidean distance $d_1$ to said first block among listed vectors having a one in said first bit position of corresponding source bit sequences; and
third logic to calculate a bit reliability for said first bit position using $d_0$ and $d_1$.

7. The apparatus of claim 6, wherein:
said demapper/demodulator further includes logic to, for other blocks in said multiple blocks, calculate an estimated received vector for each possible vector of length M of source symbols, generate a list with said estimated received vectors, and use said list to generate bit reliabilities.

8. The apparatus of claim 6, wherein:
said third logic includes logic to determine a difference between $d_0$ and $d_1$.

* * * * *